US008072993B2

(12) United States Patent
Wentink et al.

(10) Patent No.: US 8,072,993 B2
(45) Date of Patent: Dec. 6, 2011

(54) SYSTEMS AND METHODS FOR COMMUNICATING TO A DISASSOCIATED STATION IN A PROTECTED NETWORK

(75) Inventors: Menzo Wentink, Utrecht (NL); Haw-minn Lu, San Diego, CA (US)

(73) Assignee: Conexant Systems, Inc., Newport Beach, CA (US)

( * ) Notice: Subject to any disclaimer, the term of this patent is extended or adjusted under 35 U.S.C. 154(b) by 831 days.

(21) Appl. No.: 12/106,252

(22) Filed: Apr. 18, 2008

(65) Prior Publication Data

US 2008/0285495 A1 Nov. 20, 2008

Related U.S. Application Data

(60) Provisional application No. 60/930,185, filed on May 15, 2007.

(51) Int. Cl.
*H04L 12/56* (2006.01)
(52) U.S. Cl. ........................................................ 370/401
(58) Field of Classification Search .......................... None
See application file for complete search history.

(56) References Cited

U.S. PATENT DOCUMENTS

| 6,304,659 | B1 * | 10/2001 | Gold et al. ................... 380/239 |
| 7,577,434 | B2 | 8/2009 | Nakano et al. |
| 7,631,070 | B2 | 12/2009 | Lewis |
| 7,698,550 | B2 | 4/2010 | Abhishek et al. |
| 7,710,934 | B2 | 5/2010 | Cho et al. |
| 7,721,325 | B2 | 5/2010 | Lee et al. |
| 7,849,140 | B2 * | 12/2010 | Abdel-Aziz et al. ......... 709/206 |

| 2002/0163920 | A1 * | 11/2002 | Walker et al. ................. 370/401 |
| 2006/0062391 | A1 | 3/2006 | Lee et al. |
| 2006/0256769 | A1 | 11/2006 | Cho et al. |

OTHER PUBLICATIONS

LAN/MAM Standards Committee, "Part 11: Wireless LAN Medium Access Control (MAC) and Physical Layer (PHY) Specifications", IEEE Standard for Information Technology-Telecommunications and Information Exchange Between Systems-Local and Metropolitan Area Networks-Specific Requirements, Jun. 12, 2007, pp. 1-1232, IEEE Std 802.11-2007, Revision of IEEE Std 802.11-1999, IEEE, New York, New York, United States of America.

* cited by examiner

*Primary Examiner* — Raj Jain
(74) *Attorney, Agent, or Firm* — Farjami & Farjami LLP

(57) ABSTRACT

Stations in standby mode in a wireless local area network (WLAN) become disassociated with their access point. In the event traffic is intended for the station in standby mode, a wakeup message needs to be communicated to the station. Typically, a wakeup message could be broadcast on a broadcast or multicast address, and when the station checks for broadcasts, the station can determine whether it needs to wake up. However, in a protected network, a disassociated station cannot decrypt messages from the access point without reassociating. However, the cost of reassociating in time and power can be significant, so reassociating should not be performed unless the station needs to wake up, leading to a vicious cycle as the station does not know it must wake up unless it can decrypt the message. To address this issue, in one embodiment the access points do not encrypt messages on a select multicast address, whereby messages such as wakeup message can be transmitted. In another embodiment, the messages are still encrypted. However, the identification of which station must wake up is encoded as the length of the encrypted payload. These methods allow a general message of communicating to disassociated stations in a protected WLAN environment.

14 Claims, 11 Drawing Sheets

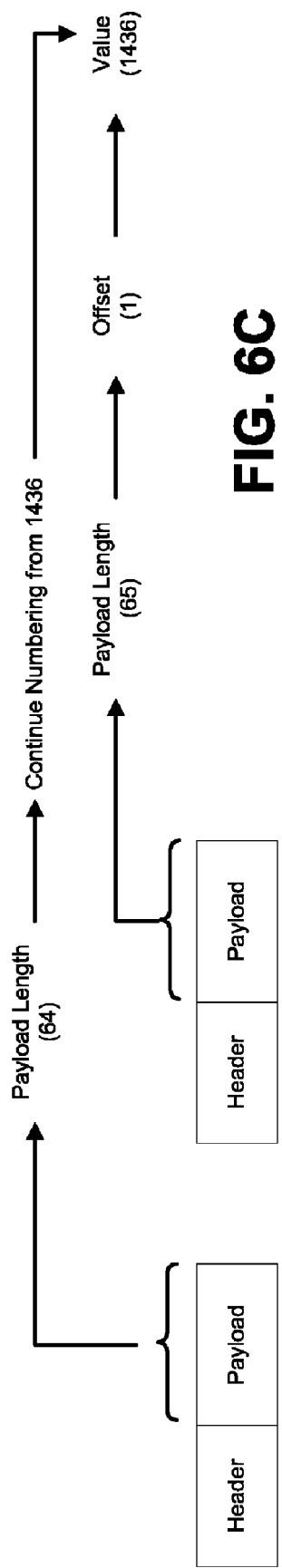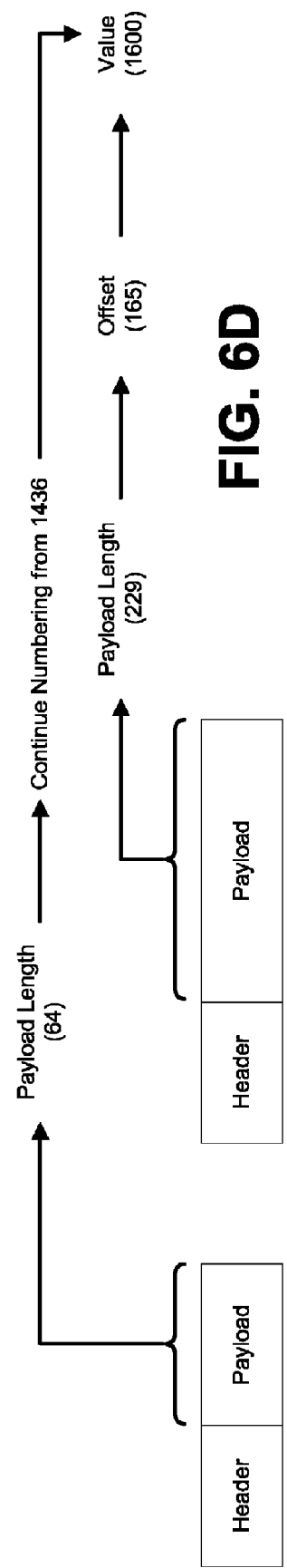
FIG. 6C
FIG. 6D

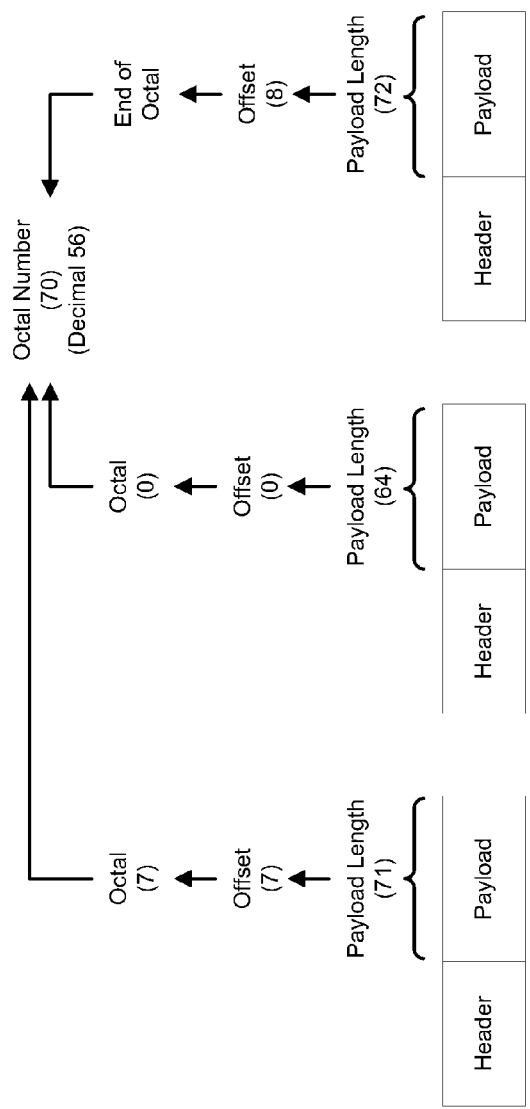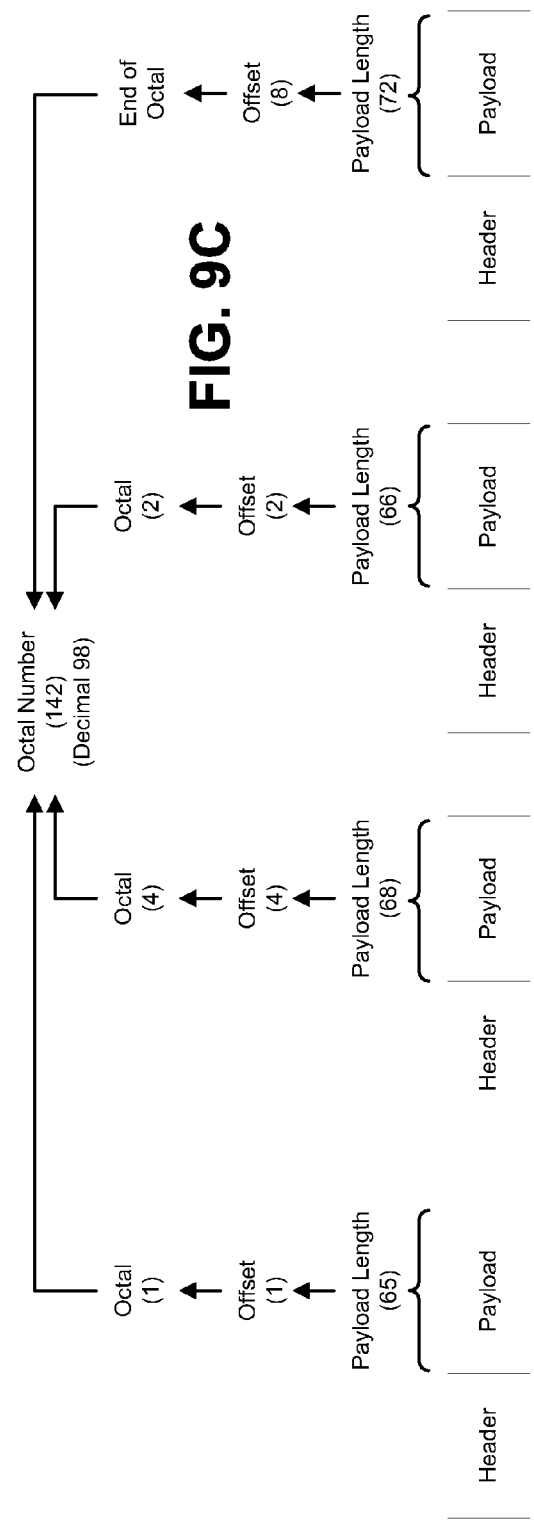

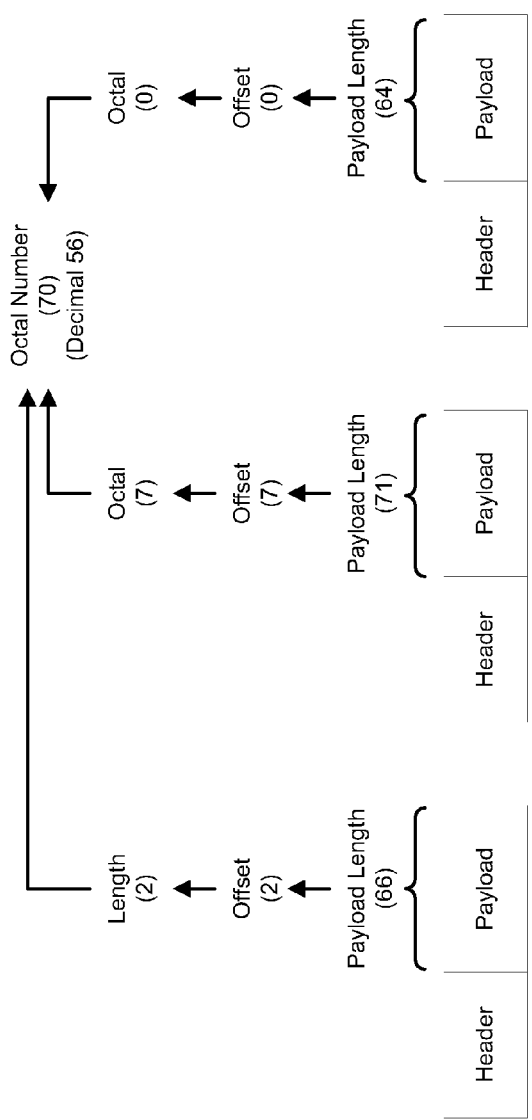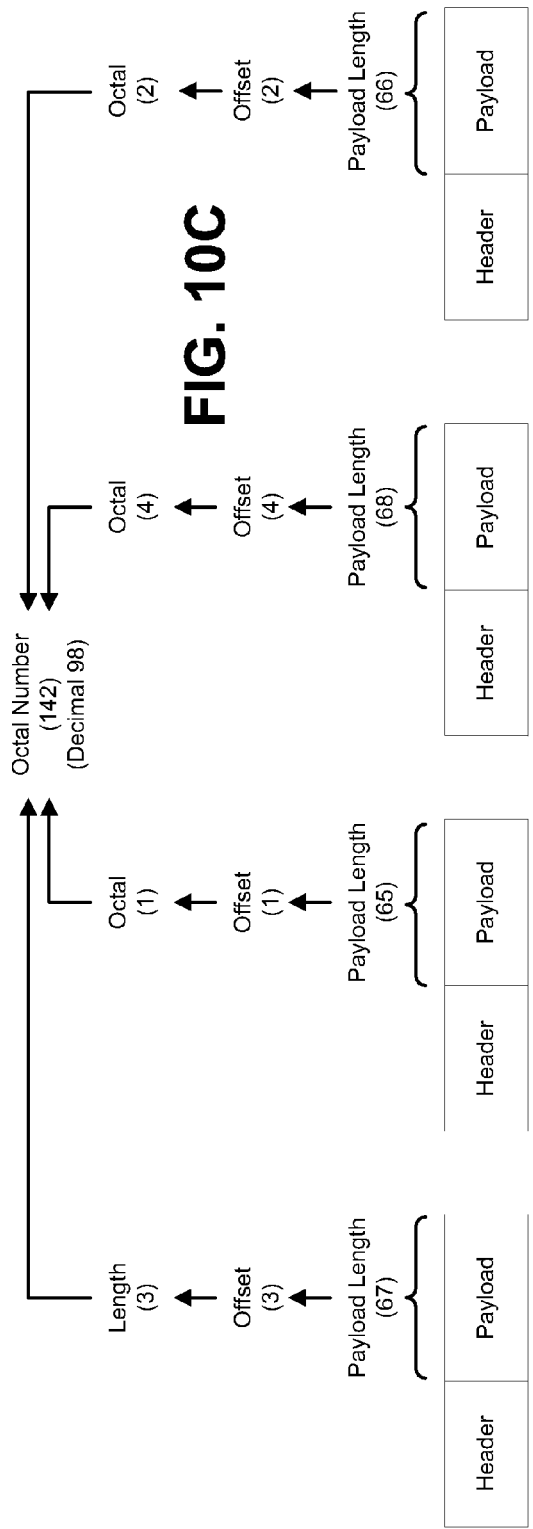

SYSTEMS AND METHODS FOR COMMUNICATING TO A DISASSOCIATED STATION IN A PROTECTED NETWORK

CROSS-REFERENCE TO RELATED APPLICATION

Under 35 U.S.C. §119, this application claims priority to, and the benefit of, U.S. Provisional Patent Application entitled, "Wakeup Frame for Wireless LAN," having Ser. No. 60/930,185, filed on May 15, 2007, which is incorporated by reference in its entirety.

BACKGROUND OF THE INVENTION

1. Field of the Invention

The present disclosure generally relates to wireless communications and more particularly relates to systems and methods for communicating with stations in standby mode in an encrypted environment.

2. Background Information

Among other things, FIG. 1 illustrates a typical network configuration for communicating data between stations via an access point in a wireless local area network (WLAN) or 802.11-based network. As illustrated in the non-limiting example of FIG. 1, a network 140 may be coupled to access points 130 and 132. In some embodiments, the network 140 may be the Internet, for example, and can be connected to an external computer such as central computer 150. Access point 130 can be configured to provide wireless communications to various wireless devices or stations 110, 120, 124. Furthermore, access point 132 can be configured to provide wireless communications to various wireless devices or stations 112, 114 and 116. Depending on the particular configuration, stations 110, 112, 114, 116, 120, and 124 may be a personal computer (PC), a laptop computer, a mobile phone, a personal digital assistant (PDA), and/or other device configured for wirelessly sending and/or receiving data. Furthermore, access points 130 and 132 may be configured to provide a variety of wireless communications services, including but not limited to: Wireless Fidelity (WIFI) services, Worldwide Interoperability for Microwave Access (WiMAX) services, and wireless session initiation protocol (SIP) services. Furthermore, the stations 110, 120, 124 may be configured for WIFI communications (including, but not limited to 802.11, 802.11b, 802.11a/b, 802.11g, and/or 802.11n).

Access point 130, for example, periodically broadcasts a beacon frame to various stations at a beacon period. The beacon frame is used by an access point to announce its presence and to relay information. For example, if station 110 is a laptop and is powered up or is transported to a location within range of access point 130, station 110 listens for a beacon frame from all access points in its range. Each access point within range transmits a beacon frame and depending on the system, the user at station 110 can select which access point to use, thereby making an association between station 110 and the access point.

In order to save power, stations can be put into standby mode or a deep sleep mode. Also, for the purposes of this disclosure the term "sleep mode" will be taken to mean an operating state entered by a computing device either upon initiation by a user or after expiration of a period of sufficient inactivity in which the amount of power supplied to the device is reduced as compared to the amount supplied during normal operation.

Due in part to the dynamic technology dependent nature of today's workplace, network administrators must constantly perform functions requiring access of individual network nodes from the administrator's computer. These functions can include configuring new nodes, updating and installing software, adding network printers, scanning for viruses, and file back-ups to name a few. Typically, many of these administrative functions are scheduled for execution after normal business hours so as to minimize interference with user applications during the work day. However, during these after hour times, individual computers on the LAN may be in one of a variety of power conserving modes, also known as sleep modes. Typically, the power conserving modes cause the display to be put in a low power state, the hard drive to be spun down and even the microprocessor to reduce its clock frequency or to be shut down completely. In the case where the computers are actually stations on a WLAN, the antenna and the radio frequency (RF) circuitry are shutdown or put into a power saving inactive mode. Having the computers powered down can make it difficult if not impossible to schedule and implement after hours network events. If the administrator has to physically turn on each machine, the efficiencies of centralized network administration are lost.

In another set of circumstances, if the wireless station has enabled a phone function perhaps in a voice over IP (VoIP) setting, the station may need to wake up to receive the call.

In U.S. patent application Ser. No. 10/995,188, filed Nov. 24, 2004, entitled "Systems and Methods for Wireless Wake-On-LAN for Wireless LAN Devices," a wakeup data sequence is broadcast by an access point to all stations. Each station periodically wakes up and receives the wakeup data sequence, if present. The wakeup data sequence identifies which stations need to wake up. If a station receives the wakeup data sequence, but is not identified, it returns to standby mode.

When a station goes into standby mode, it is disassociated with the access point. In a protected environment, such as when Wired Equivalent Privacy (WEP) is used, the frame body of all data frames from the access point is encrypted. Because a station in standby mode is disassociated, it cannot decrypt data frames from the access point. The station will not be able to decrypt the body of a wakeup data sequence as broadcast by the access point. So even if the station were able to determine that there was a wakeup data sequence broadcast by the access point, the station could not decode the frame body and hence would not know which stations need to wake up. Accordingly, various needs exist in the industry to address the aforementioned deficiencies and inadequacies.

SUMMARY OF INVENTION

The methods and systems described herein can be used to address the aforementioned deficiencies. One embodiment of a method and system relies on an access point distinguishing a particular reserved multicast destination address as for disassociated or unencrypted communications. When an access point receives a multicast transmission addressed to the reserved multicast destination address, the access point will not encrypt the transmission regardless of whether the access point is functioning in a protected mode. As a counterpart, the station will recognize that even though the WLAN is protected and the station is disassociated, a multicast on the reserved address will be unencrypted and may contain a message it is interested in. In particular, the message could be a wakeup message specifying which station needs to wake up and reassociate.

In another embodiment, an external system transmits a message over reserved multicast address, but encodes the message through the length of the payload, so that even if the multicast transmission is encrypted, a disassociated station can decode the message from the payload length. Because there are length limitations on frame size, various methods can be used to distribute a message over a sequence of frames. Again the message could be an instruction for a disassociated station to wake up and reassociate.

In both embodiments, a reserved multicast address can be agreed upon by a convention such as specification by a standards body such as by Institute of Electrical and Electronics Engineers (IEEE). Furthermore, both methods are interoperable with an unprotected environment.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIGS. 6A-D illustrate a multiple frame approach that can be used;

FIGS. 9A-C show a multiplicative approach where each payload length encompasses eight values representing three bits of information; and FIGS. 10A-10C show a multiplicative approach where each payload length encompasses eight values representing three bits of information, and the first payload of the first frame represents the number of subsequent frames required to encode the message.

DETAILED DESCRIPTION

A detailed description of embodiments of the present invention is presented below. While the disclosure will be described in connection with these drawings, there is no intent to limit it to the embodiment or embodiments disclosed herein. On the contrary, the intent is to cover all alternatives, modifications and equivalents included within the spirit and scope of the disclosure as defined by the appended claims.

Figure 1:
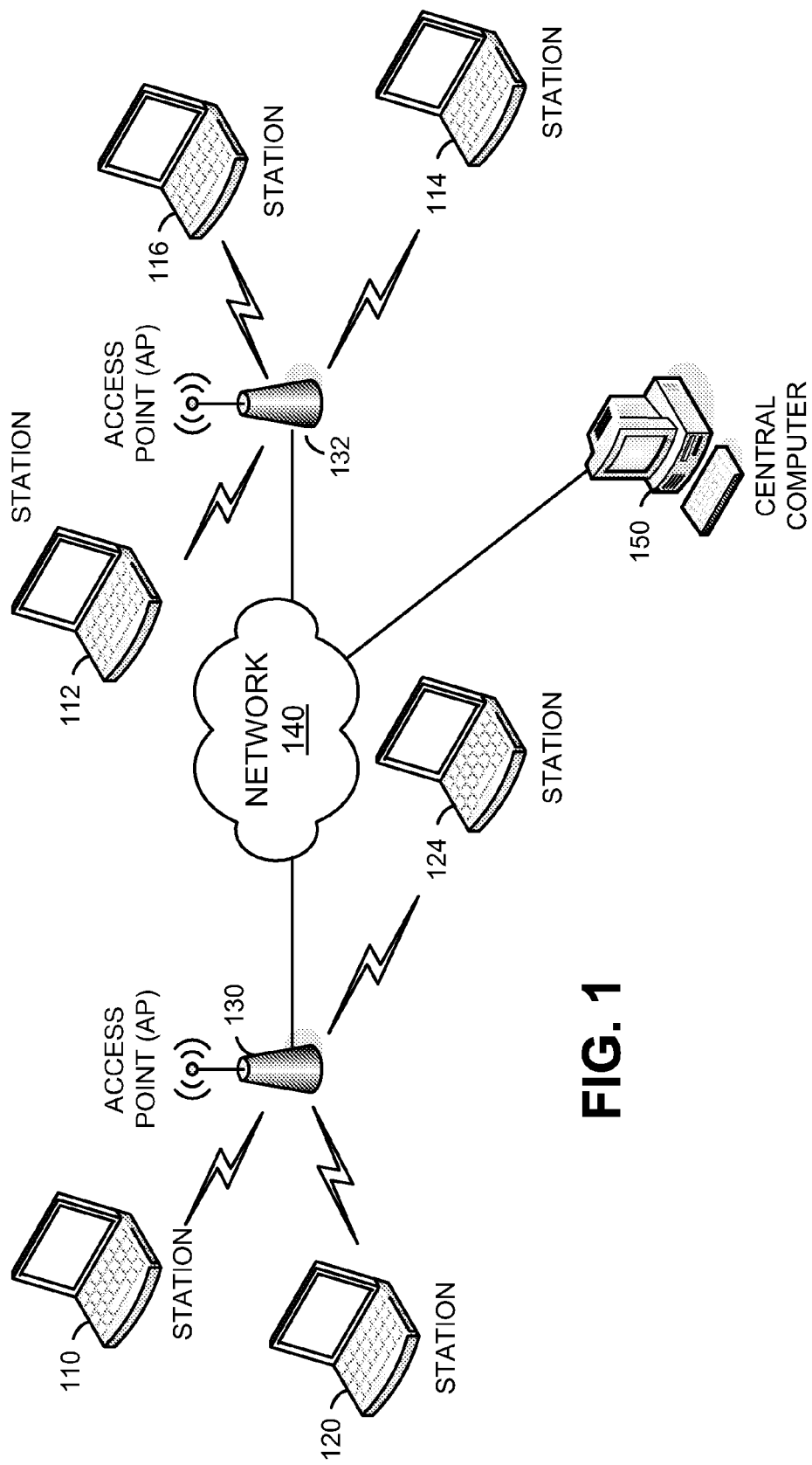
FIG. 1 illustrates a typical network configuration for communicating data between stations via an access point in a WLAN or 802.11-based network.
Figure 2:
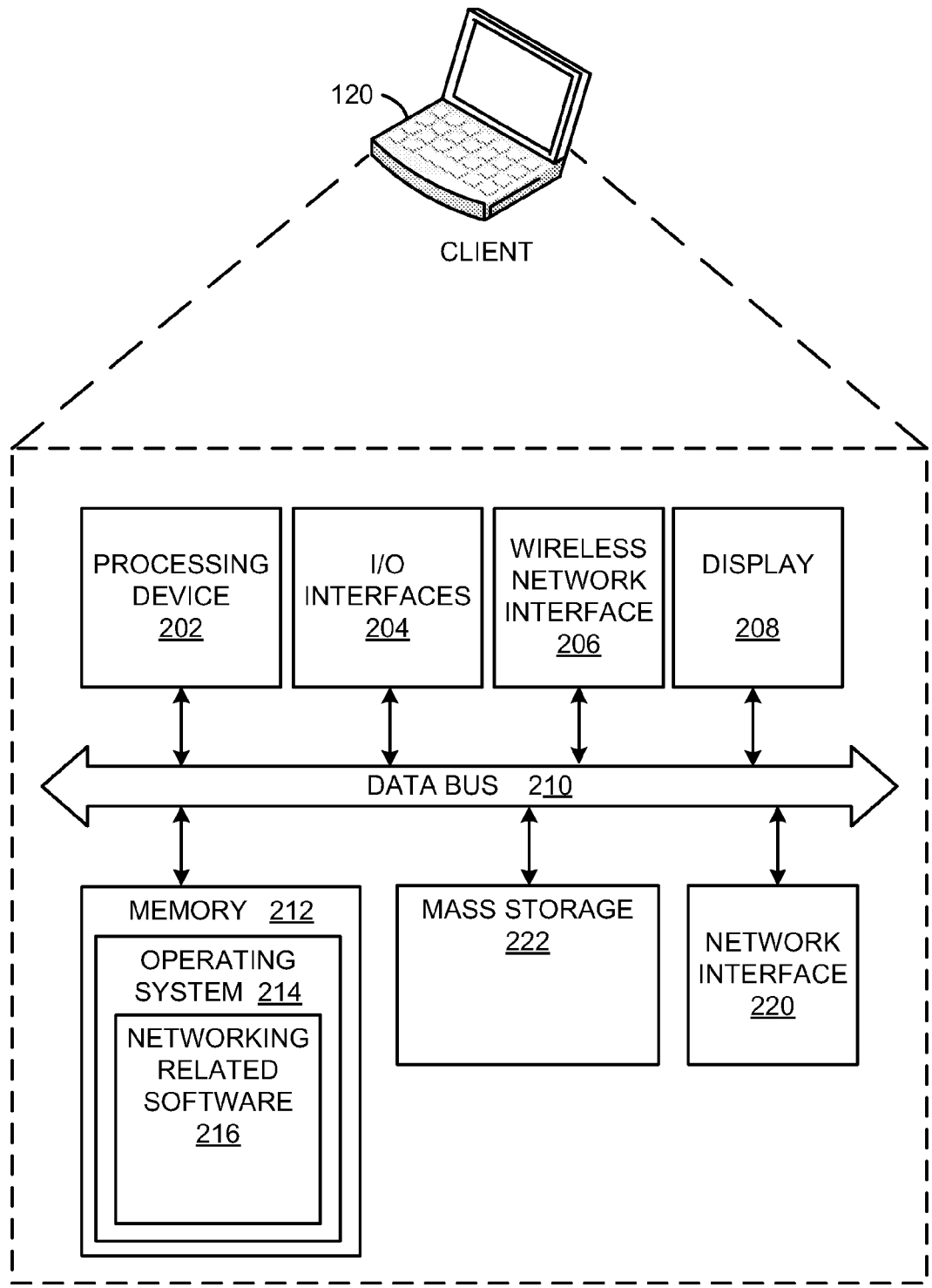
FIG. 2 illustrates an embodiment of one of the wireless devices/stations shown in FIG. 1.

FIG. 2 illustrates an embodiment of one of the wireless devices/stations shown in FIG. 1. It can be configured to receive and process messages as disclosed below. Generally speaking, station 120 can comprise any one of a wide variety of wireless computing devices, such as a desktop computer, portable computer, dedicated server computer, multiprocessor computing device, cellular telephone, PDA, handheld or pen based computer, embedded appliance, and so forth. Irrespective of its specific arrangement, station 120 can, for instance, comprise memory 212, processing device 202, a number of input/output interfaces 204, wireless network interface device 206, display 208, and mass storage 222, wherein each of these devices is connected across one or more data buses 210. Optionally, station 120 can also comprise a network interface device 220 also connected across one or more data buses 210.

Processing device 202 can include any custom made or commercially available processor, a central processing unit (CPU) or an auxiliary processor among several processors associated with the computing device 120, a semiconductor based microprocessor (in the form of a microchip), a macroprocessor, one or more application specific integrated circuits (ASICs), a plurality of suitably configured digital logic gates, or generally any device for executing instructions.

Input/output interfaces 204 provide any number of interfaces for the input and output of data. For example, where station 120 comprises a PC, these components may interface with user input device 204, which may be a keyboard or a mouse. Where station 120 comprises a handheld device (e.g., PDA, mobile telephone), these components may interface with function keys or buttons, a touch sensitive screen, a stylist, etc. Display 208 can comprise a computer monitor or a plasma screen for a PC or a liquid crystal display (LCD) on a hand held device, for example.

Wireless network interface device 206 and optionally network interface device 220 comprises various components used to transmit and/or receive data over a network environment. By way of example, these may include a device that can communicate with both inputs and outputs, for instance, a modulator/demodulator (e.g., a modem), wireless (e.g., RF) transceiver, a telephonic interface, a bridge, a router, network card, etc. Station 120 can use wireless network interface device 206 to communicate with access point 130.

With further reference to FIG. 2, memory 212 can include any one of a combination of volatile memory elements (e.g., random-access memory (RAM), such as DRAM, and SRAM, etc.) and nonvolatile memory elements (e.g., flash, read only memory (ROM), nonvolatile RAM, etc.). Mass storage 222 can also include nonvolatile memory elements (e.g., flash, hard drive, tape, CDROM, etc.) Memory 212 comprises software which may include one or more separate programs, each of which includes an ordered listing of executable instructions for implementing logical functions. Often, the executable code can be loaded from nonvolatile memory elements including from components of memory 212 and mass storage 222. Specifically, the software can include native operating system 214, one or more native applications, emulation systems, or emulated applications for any of a variety of operating systems and/or emulated hardware platforms, emulated operating systems, etc. These may further include networking related software 216 which can further comprise a communications protocol stack comprising a physical layer, a link layer, a network layer and a transport layer. Network related software 216 can be used by processing device 202 to communicate with access point 130 through wireless network interface 206 and can further include logic that causes the processor to receive instructions from an access point while disassociated with access point 130. In particular, the software can receive a wakeup instruction from the access point even in a protected wireless network. The software can comprise logic that maps the length of encrypted payloads of protected frames into a message. It should be noted, however, that the logic for performing these processes can also be implemented in hardware or a combination of software and hardware. One of ordinary skill in the art will appreciate that the memory 212 can, and typically will, comprise other components which have been omitted for purposes of brevity.

Figure 3:
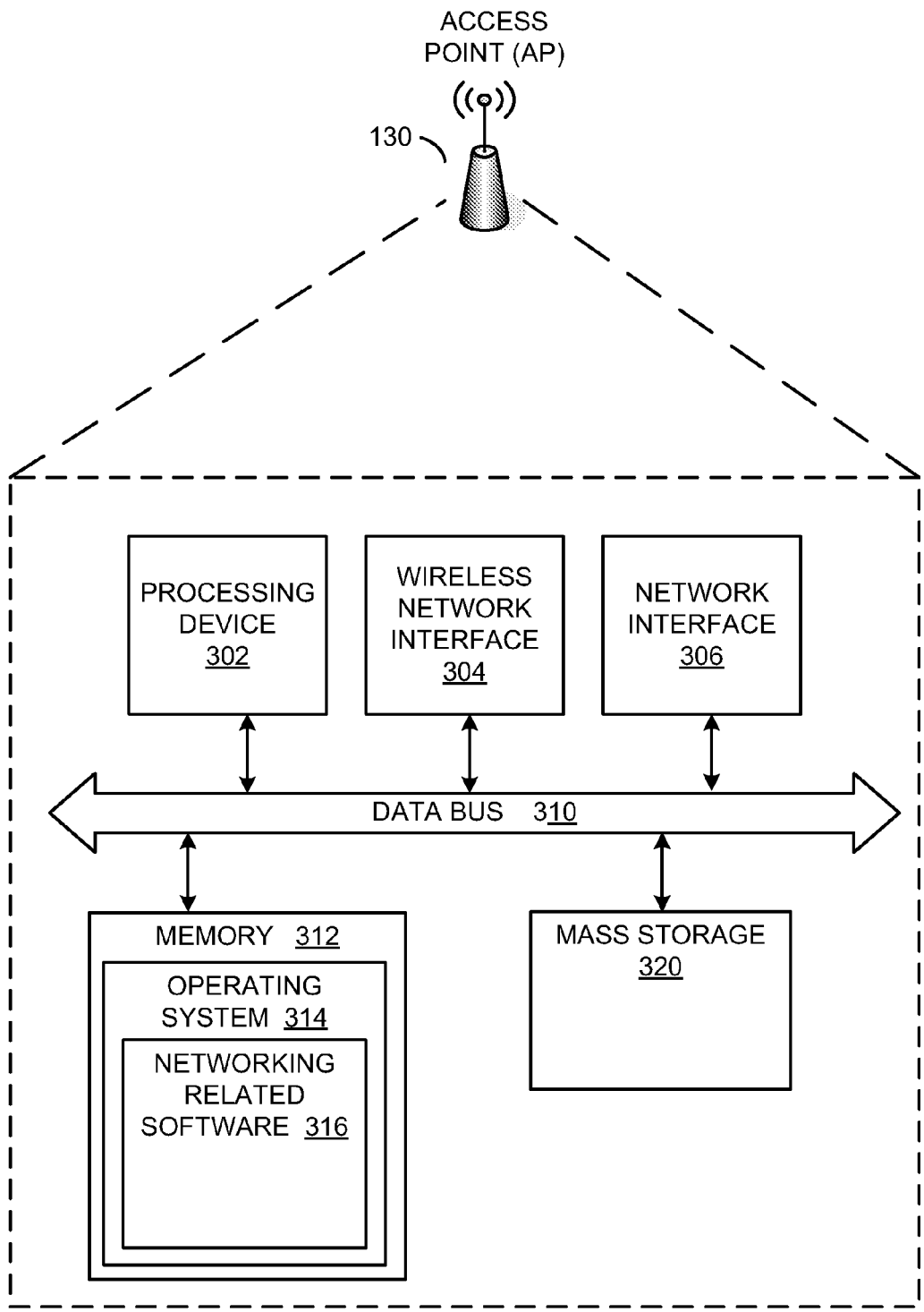
FIG. 3 illustrates an embodiment of one of the access points shown in FIG. 1.

FIG. 3 illustrates an embodiment of one of the access points shown in FIG. 1. It can be configured to receive and process messages as disclosed below. Generally speaking, station 120 can comprise any one of a wide variety of network functions, including network address translation (NAT), routing, dynamic host configuration protocol (DHCP), domain name services (DNS) and firewall functions. Irrespective of its specific arrangement, the stations 120 can, for instance, comprise memory 312, a processing device 302, wireless network interface 304, network interface 306, and nonvolatile storage 324, wherein each of these devices is connected across one or more data buses 310.

Processing device 302 can include any custom made or commercially available processor, a CPU or an auxiliary processor among several processors associated with access point 130, a semiconductor based microprocessor (in the form of a microchip), a macroprocessor, one or more ASICs, a plurality of suitably configured digital logic gates, or generally any device for executing instructions.

Wireless network interface device 304 and network interface device 306 comprise various components used to transmit and/or receive data over a network environment. By way of example, either interface may include a device that can communicate with both inputs and outputs, for instance, a modulator/demodulator (e.g., a modem), wireless (e.g., RF) transceiver, a telephonic interface, a bridge, a router, network card, etc. Access point 130 typically uses wireless network interface device 304 to communicate with nearby stations, and network interface device 306 to communicate with network 140. In some implementation, the two devices can be combined into one physical unit.

With further reference to FIG. 3, memory 312 can include any one of a combination of volatile memory elements (e.g., RAM, such as DRAM, and SRAM, etc.) and nonvolatile memory elements (e.g., flash, ROM, nonvolatile RAM, hard drive, tape, CDROM, etc.). Memory 312 comprises software which may include one or more separate programs, each of which includes an ordered listing of executable instructions for implementing logical functions. Often, the executable code and persistent configuration parameters can be loaded from nonvolatile memory elements including from components of memory 312. Specifically, the software can include native operating system 314, one or more native applications, emulation systems, or emulated applications for any of a variety of operating systems and/or emulated hardware platforms, emulated operating systems, etc. These may further include networking related software 322 which can further comprise a communications protocol stack comprising a physical layer, a link layer, a network layer and a transport layer. These may further include networking related software 316 which can further comprise a communications protocol stack comprising a physical layer, a link layer, a network layer and a transport layer. Network related software 316 can be used by processing device 302 to communicate with access point 130 through wireless network interface 306 and can further include logic that causes the processor to receive messages broadcast to a special multicast address and retransmit the messages to nearby stations in unencrypted form regardless of whether access point 130 is operating on a protected WLAN. It should be noted, however, that the logic for performing these processes can also be implemented in hardware or a combination of software and hardware. One of ordinary skill in the art will appreciate that the memory 312 can, and typically will, comprise other components which have been omitted for purposes of brevity.

Figure 4:
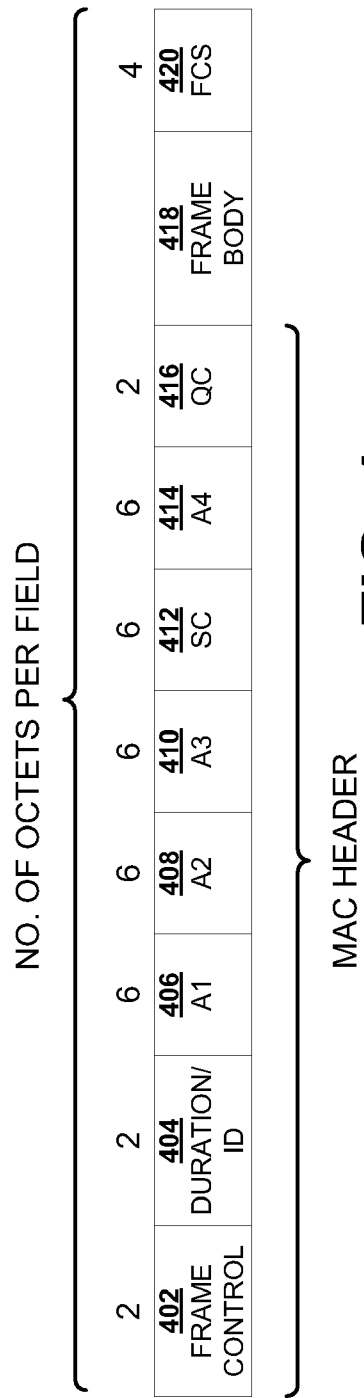
FIG. 4 shows the format for a data frame.

FIG. 4 shows the format for a data frame. Fields 402, 404, 406, 408, 410, 412, 414 and 416 are collectively referred to as the media access control (MAC) header. Frame control field 402 is a two octet fixed field indicative of properties of the frame as defined by the particular standard. It comprises a bit which when set indicates the frame is protected. Duration/ID field 404 is a two octet fixed field which comprises either duration information or identification information depending on the frame use as defined by the particular standard. Address fields 406, 408, 410, and 414 are used to specify various address parameters. Typically in a multicast or broadcast application, address field 406 which is the receiver address is set to a multicast or broadcast address. Address field 408 which is the sender address is usually set to the BSSID. Address field 410 which is the source address is set to the address of the sender of the frame. Address field 414 is optional and is not used in a typical multicast or broadcast application. Sequence control field 412 is a two octet fixed field which comprises a fragment number and a sequence number. The fragment number is used when a frame is fragmented to keep track of the fragments. The sequence number is incremented each time a station transmits a message. Quality of service (QoS) control field 416 is a two octet field used to carry QoS parameters.

After the MAC header, the data frame includes frame body 418 which contains the payload. Frame body 418 is encrypted as specified by the standard if the frame is protected. Finally, frame check sequence field 420 is a four octet fixed field indicative of the integrity of the frame. The specific integrity check is specified by the standard, but as an example, some standards use a cyclic redundancy code (CRC).

Referring to the architecture in FIG. 1, central computer 150 located somewhere on network 140 needs to wake up station 110. The central computer prepares a multicast message and transmits it to a multicast address. Access point 130 receives the multicast message addressed to multicast address and transmits it to stations within its range. If access point 130 is not a protected access point, then prior art methods to wake up station 110 could be used. However, if access point 130 is protected, if station 110 is in standby mode and disassociated with access point 130, it cannot decrypt messages from access point 130 without reassociating with access point 130 which is costly in energy consumption as the station would have to roam and scan. Due to the cost in resources, it is desirable to reassociate only if access point 130 has traffic for station 110. This results in a vicious circle, that is, a station should not reassociate unless traffic is waiting for the station, but the station cannot know if there is traffic waiting for the station unless it reassociates.

One solution uses a specially designated multicast address. Many multicast addresses are designated for many purposes. For example, some are used for broadcast of media. There are also multicast addresses that are designated for specific purposes. These special multicast addresses are typical designated by a standards body and are used for a specific purpose. For example, there is a multicast address that is used for the specific purpose of address resolution. For this solution, there could be a multicast address specifically for waking up disassociated stations or generally for communicating with disassociated stations. This address could be any multicast address agreed upon by convention or at least agreed upon by the central computer and the stations, but preferably would be an address that is designated with a special purpose. While for the purposes of this disclosure, this address will be referred to as the wakeup multicast address, it is understood that the address could apply to the more general purpose of communicating with disassociated stations.

In one embodiment, the access point upon receiving a multicast request through a network from a central computer, recognizes the destination address as a wakeup multicast address, that is, address frame 406 contains the wakeup multicast address. Rather than encrypting the payload and transmitting a multicast data frame, the access point creates a multicast frame without encrypting the payload. A station in standby mode wakes up and checks the multicast frames. This wake up can take place periodically at predetermined times, such as in the usually broadcast and multicast opportunity that occurs after a delivery traffic indication map (DTIM) beacon frame. When it sees a multicast frame with the destination address matching the wakeup multicast address, it recognizes the frame as a special multicast frame that is designated for disassociated stations. The station recognizes that the payload is not encrypted and can read the message. If the message is a wakeup message, the station can determine if it must wake up from the payload of the wakeup message. If so, the station reassociates with the access point and can now receive encrypted data designated for it. If the station determines it is not the intended recipient of the wakeup message, it can return to standby mode.

One drawback of this embodiment is that the access points must be aware of the wakeup multicast address and conditionally apply encryption not to data frames destined for the wakeup multicast address. This would require the APs to be upgraded. This amounts to requiring an upgrade in the infrastructure. While this may be done through software/firmware updates. It is likely a change in the standards would need to be established to implement this approach. Thus, it is desirable to have a solution where only the stations and the central computer need to be aware of the wakeup multicast frame, because such a solution would not require any infrastructure changes to be made.

In another embodiment, a central computer transmits a multicast message to the access point. The payload of the message is a dummy message, however, the length of the payload is indicative of the station or group of stations to wake up, or in general the length of the payload is a message or part of a message to be transmitted to one or more disassociated clients. The central computer sends the message to all connected access point(s) with the wakeup multicast address as the destination. In the example of FIG. 1, central computer 150 would broadcast the wakeup message to access points 130 and 132. The access point(s) receives the message but only recognizes the message as destined to a multicast address and not necessarily a multicast address with a special purpose. The access point encrypts the payload and transmits the multicast frame. When the station then receives the frame, it recognizes the wakeup multicast address and determines the length of the payload. Depending on the implementation, the payload size may exclude header and encryption information added by the access point to encrypt the payload. In this manner, the central computer does not need to be aware of the added length created by the encryption process. The length can then be mapped to a station or group of stations for which the wakeup message is intended.

The payload length can typically be varied between the order of 0 and 1500 Bytes, or between 64 and 1500 Bytes when the minimum Ethernet packet size is taken into account, or between 8 and 1500 Bytes when the Logical Link Control/Subnetwork Access Protocol (LLC/SNAP) header is taken into account (which is always present in 802.11 frames), or between 28 and 1500 if the wakeup message is sent as an IP packet (the IP header is 20 Bytes, plus 8 for the LLC/SNAP header). Therefore, to be more agnostic to the higher protocol layers, a range of 64 to 1500 should used.

For the sake of the specific examples, a minimum of 64 and a maximum of 1500 are used. The use of these values should in no way be construed to limit the embodiments to this value.

Figure 5:
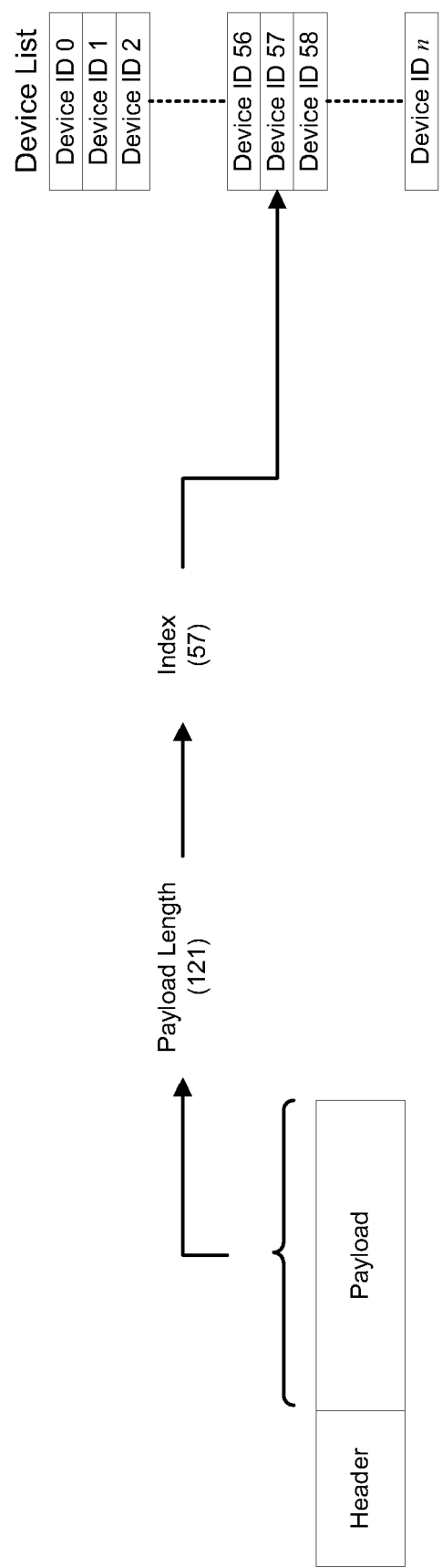
FIG. 5 shows how the payload length can be related to a station.

There are several approaches to mapping the payload length to a station. The most basic is to take the length and subtract the minimum length to obtain the index. For example, as depicted in FIG. 5, suppose the payload length is 121 and by convention the agreed minimum length is 64, then station 57 (121−64) should wake up, where station 57 is the 57$^{th}$ entry in a station list.

Another approach is to map the MAC address through some function to yield a value between the minimum and maximum length. For example, the length can be associated with 64+MAC address MOD 1436 to yield a length between 64 and 1500. This runs the risk that by coincidence more than one station maps to the same length. Under this situation, a station may awaken and reassociate unnecessarily. As the odds of this happening should be small, this mapping may be preferable as it eliminates the need to keep track of and maintain stations list. Although the odds of coincidentally two stations on the same network being mapped to the same length should be remote, due to commonalities in the portions of the MAC addresses, for example, there is a portion unique to each manufacturer, the probabilities may not be as remote. This can be resolved by first running the MAC address through a cryptographic hash. Thus, in the example above, the length is associated with 64+hash (MAC address) MOD 1436.

Figure 6A:
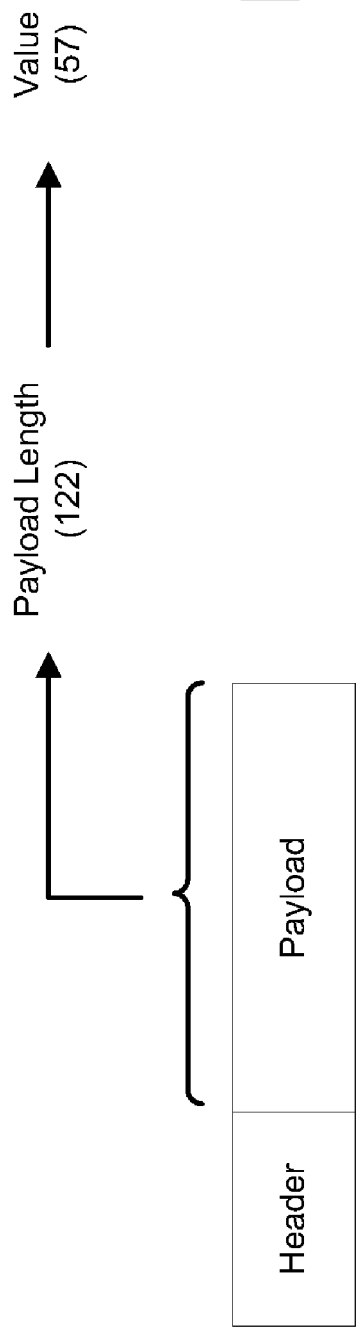
Figure 6B:
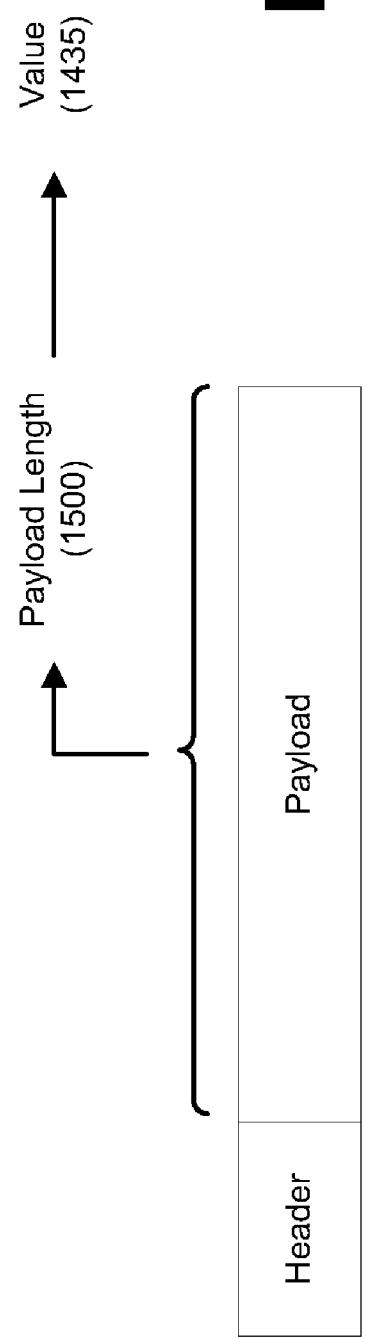

FIGS. 6A-D illustrate a multiple frame approach that can be used in the unlikely event 1436 values is not sufficient to convey the message to the desired station. The minimum length 64 is reserved as a continuation symbol. While the choice of the minimum length as a continuation symbol is used here, it is understood that equivalently any symbol between the minimum length and the maximum length could be used. FIGS. 6A and 6B illustrate representations of values from 1 to 1435. The mapping is similar to that given above except the minimum is set to 65 because the length 64 is reserved. FIG. 6A shows the representation of the value 57. FIG. 6B shows the representation of the value 1435. FIG. 6C illustrates how the value 1436 can be represented as 1436 is too large to be represented in a single frame. Two frames are required. As the value is greater than 1435, the first frame payload has a length of 64 which represents a continuation in counting from 1435 in the next frame payload. The length of the next frame payload is 65 which boils down to an offset value of 1, but since the frame is a continuation frame, the value is 1435 plus the offset value. FIG. 6D illustrates the representation of the value 1600. Again since the value 1600 is greater than 1435, a second frame is needed. Frame 1 would comprise a payload of length 64 and frame 2 a payload of length 1600−1435 plus the 64 minimum that is 229. The process could be extended to a third frame if the value to be represented is greater than 2870, and so on. However, with the use of multiple frames it can be more efficient to set a smaller maximum value rather than 1500 and use more frames. For strings of more than two frames, a specific length value could be designated to demarcate the beginning of a sequence.

Figure 7:
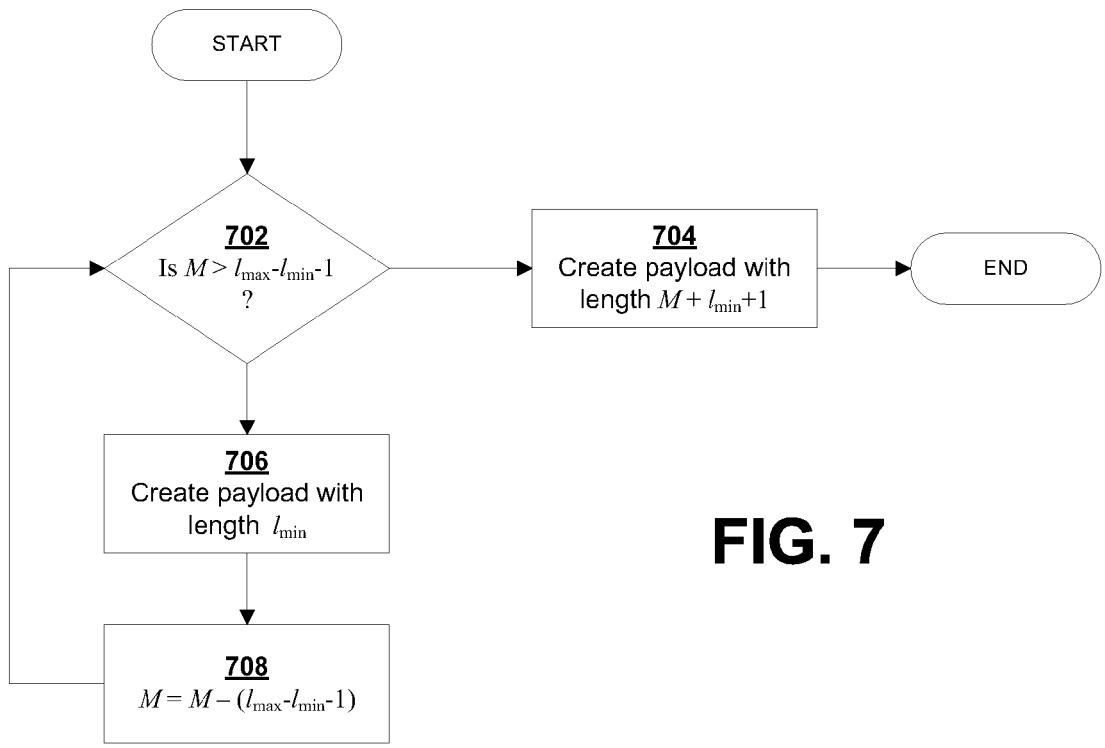
FIG. 7 is a flowchart describing the method of encoding a message based on the approach of FIGS. 6A-D.

FIG. 7 is a flowchart describing the method of encoding a message based on the approach of FIGS. 6A-D. The message in question is encoded as a number. One of ordinary skill in the art would recognize the equivalence between a message and its representation as a number. Notationally, the number M is initially the representation of the message, and a maximum payload length and minimum payload length are represented by $l_{max}$ and $l_{min}$, respectively. Furthermore, to avoid cumbersome repetition in notation, the quantity $l_{max}-l_{min}-1$ will be referred to as the encoding range. The encoding process begins at step 702, where M is compared to the encoding range. If M is less than the encoding range, a dummy payload is created with length M+$l_{min}$+1 at step 704, the payload can then be included in a protected frame possibly as part of a frame burst. This would end the encoding process. However, if M is greater than or equal to the encoding range, a dummy payload is created with length $l_{min}$ which can then be included in a protected frame possibly as part of a frame burst at step 706. At step 708, M is decremented by the encoding range. The process then repeats at step 702.

Figure 8:
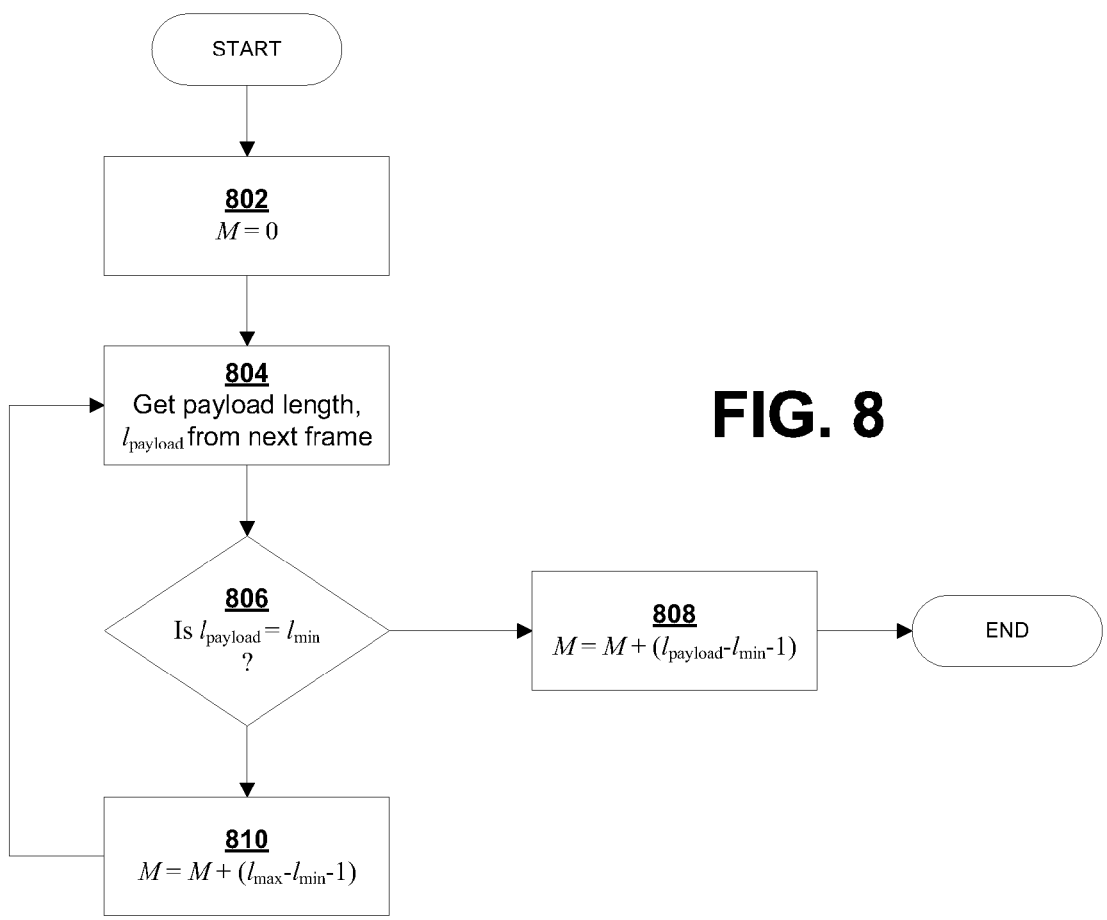
FIG. 8 is a flowchart describing the corresponding method of decoding a message encoded in accordance with FIG. 7.

FIG. 8 is a flowchart describing the corresponding method of decoding a message encoded in accordance with FIG. 7. The same notation is adopted for clarity. As each frame is received perhaps within the same burst. Initially, M is set to zero at step 802. At step 804, the payload length from the next frame is derived shown as $l_{payload}$. If $l_{payload}$ matches the continuation symbol which is $l_{min}$ in this example at step 806, then M is incremented by the encoding range at step 810 and the process repeats at step 804. However, if $l_{payload}$ is not equal to the continuation symbol, the process ends after M is incremented by $l_{payload}-l_{min}-1$ at step 808.

Figure 9A:
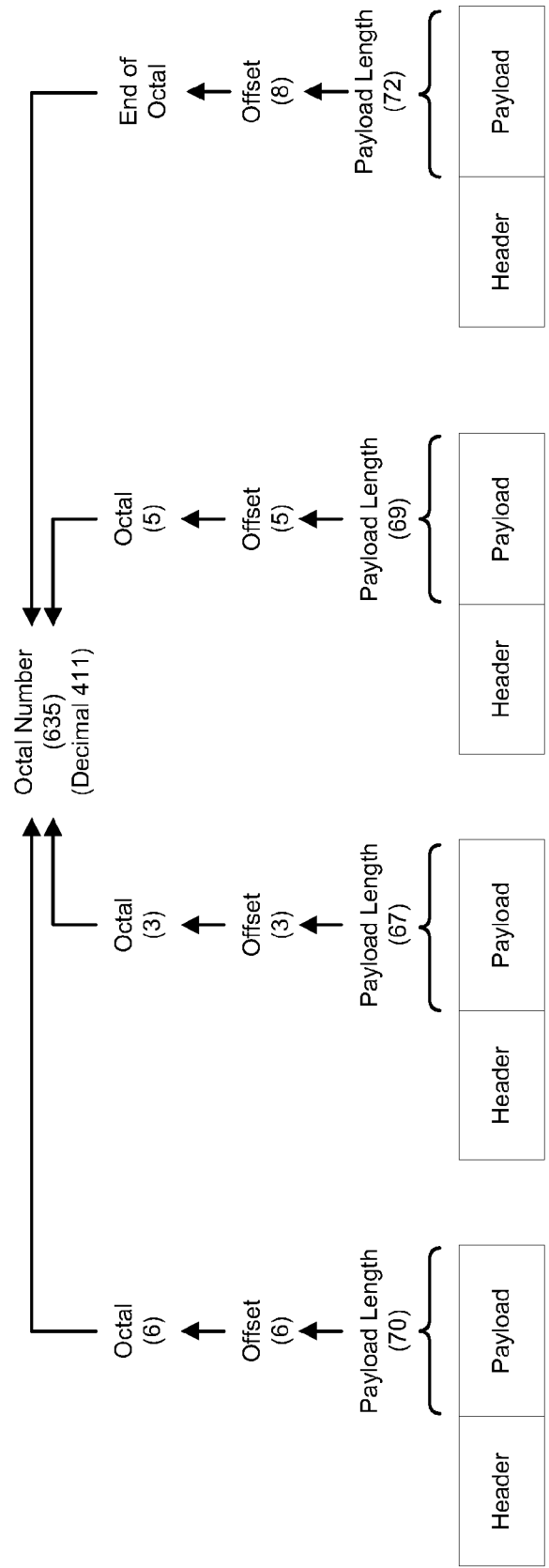

The multiple frame approach of FIGS. 6A-D is additive, that is, each additional frame gives the ability to address and add fixed number of values (e.g. an additional 1435 values). FIGS. 9A-C show a multiplicative approach where each payload length encompasses 8 values representing three bits of information. A ninth value can be used as an end of message symbol. This shorter format enables the transmission of more data using shorter messages. Specifically, in FIG. 9A, the value 411 which is 635 in octal needs to be expressed. The first frame has length 70 which corresponds to an offset of 6 from the minimum payload length, hence represents the octal digit 6 in the first digit of the octal value. The second frame has length 67 which corresponds to an offset of 3 from the minimum payload length, hence represents the octal digit 3 in the second digit of the octal value. The third frame has length 69 which corresponds to an offset of 5 from the minimum payload length, hence represents the octal digit 5 in the second digit of the octal value. Finally a fourth frame has length 72 which corresponds to an offset of 8 from the minimum payload length which represents the end of value symbol. Similarly, FIGS. 9B and 9C illustrate the formatting of the values 56 and 98, respectively.

In general, the multiplicative approach splits the message into pieces based on some numeric base, (e.g., base 8 in the previous example). While it is tempting for those skilled in the art to use a power of 2 for the base, any numeric base can be used. Each piece is then encoded by adding the minimum payload length as an offset. The message is then terminated by an end of message symbol.

Figure 10A:
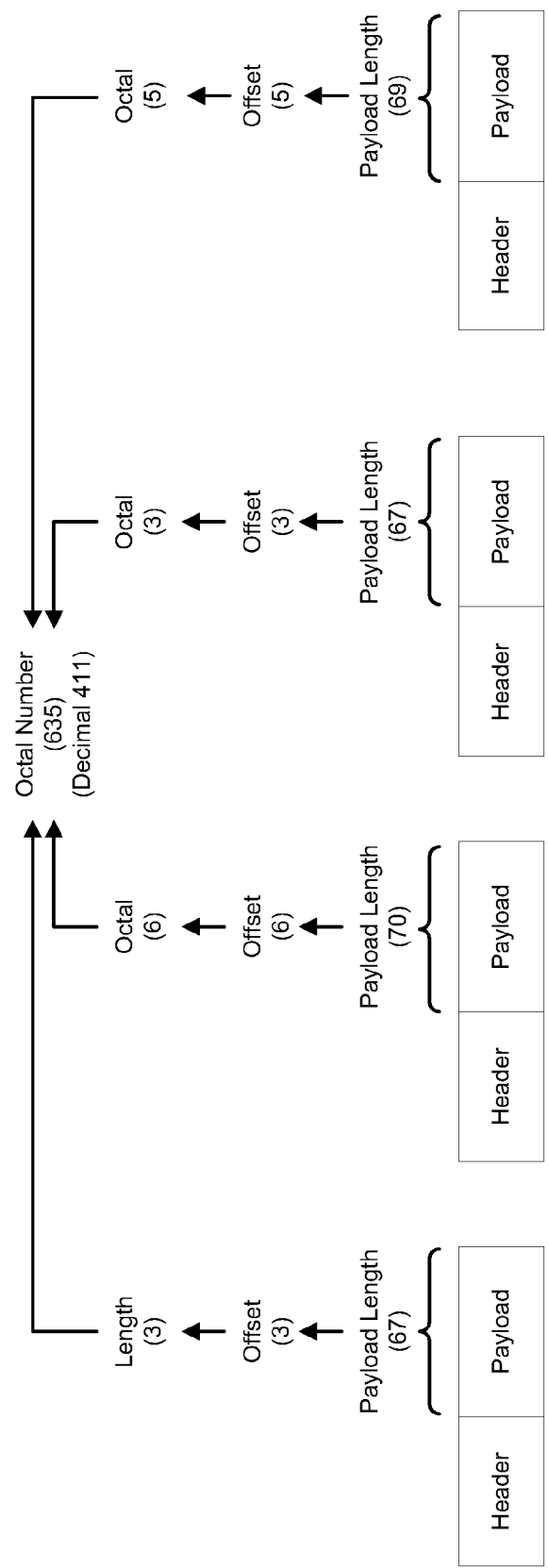

Alternatively, rather than specifying an end of message symbol the first frame could contain the number of frames representing the message. The general approach is similar to that illustrated in FIGS. 9A-9C. The message is split into pieces based on some numeric base. However, rather than expressing an end of message symbol in the last frame of the encoded message, the length of the message in frames is encoded in the payload of the first frame. Examples that are counterparts to the examples of FIGS. 9A-9C are illustrated as FIGS. 10A-10C.

The drawback to the multiple frame approaches is that sequence of the frames need to be tracked to insure the right information is tracked, but can be tracked by the sequence control frame 412.

While all the approaches above can transmit data to a disassociated station, the information rate for the amount of traffic generated is very low. The tradeoff between power usage, reassociation time and urgency of the message should be weighed. However, one of the most suitable uses is for breaking the encryption/reassociation dilemma by altering the station in standby mode to wake up, reassociate and receive an important encrypted message.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed:

1. A method comprising:
   receiving a broadcast/multicast message having a destination address and a payload from an external source; comparing the destination address with a reserved multicast address; broadcasting an unencrypted message comprising the payload to all nearby stations if the destination address matches the reserved multicast address; and if the destination address does not match the reserved multicast address, encrypting the payload into an encrypted payload and broadcasting an encrypted message comprising the encrypted payload.

2. The method of claim 1, wherein the payload comprises a station identification.

3. The method of claim 1, wherein encoding of the unencrypted message includes:
   mapping the unencrypted message to a number;
   generating one or more dummy payloads having lengths that cumulatively correspond to the number; and
   incorporating each payload into a separate protected frame.

4. The method of claim 3, wherein the generating comprises:
   generating a payload having a length equal to the number plus a predetermined minimum payload length.

5. The method of claim 3, wherein the generating comprises:
   if the number is greater than an encoding range, generating a dummy payload having a length equal to a predetermined minimum payload length and decrementing the number by the encoding range;
   repeating the previous step until the number is less than the encoding range; and
   generating a dummy payload having a length equal to the number plus the predetermined minimum length plus one;
   wherein the encoding range is equal to a predetermined maximum payload length minus the predetermined minimum payload length minus one.

6. The method of claim 3, wherein the generating comprises:
   using a predetermined numeric base to divide the number into N pieces, each having a value less than the predetermined numeric base;
   generating a dummy payload having a length equal to N plus a predetermined minimum length; and generating N additional dummy payloads corresponding to the N pieces, each having a length equal to a value representing each piece plus the predetermined minimum length.

7. The method of claim 3, wherein the generating comprises:
using a predetermined numeric base to divide the number into N pieces, each having a value less than the predetermined numeric base;
generating a dummy payload having a length equal to a reserved value that is reserved as a start of message symbol; and
generating N dummy payloads corresponding to the N pieces, each having a length equal to a value representing each piece plus a predetermined minimum length.

8. An access point comprising:
a processor, a wireless network interface device; and a memory comprising instructions, said instructions causing the processor and the wireless network interface device to perform: receiving a broadcast/multicast message having a destination address and a, payload from an external source; comparing the destination address with a reserved multicast address; broadcasting ml unencrypted message comprising the payload to all nearby stations if the destination address matches the reserved multicast address; and if the destination address does not match the reserved multicast address, encrypting the payload into an encrypted payload and broadcasting an encrypted message comprising the encrypted payload.

9. The access point of claim 8, wherein the payload comprises a station identification.

10. The access point of claim 8, wherein encoding of the unencrypted message includes:
mapping the unencrypted message to a number;
generating one or more dummy payloads having lengths that cumulatively correspond to the number; and
incorporating each payload into a separate protected frame.

11. The access point of claim 8, wherein the generating comprises:
generating a payload having a length equal to the number plus a predetermined minimum payload length.

12. The access point of claim 8, wherein the generating comprises:
if the number is greater than an encoding range, generating a dummy payload having a length equal to a predetermined minimum payload length and decrementing the number by the encoding range;
repeating the previous step until the number is less than the encoding range; and
generating a dummy payload having a length equal to the number plus the predetermined minimum length plus one;
wherein the encoding range is equal to a predetermined maximum payload length minus the predetermined minimum payload length minus one.

13. The access point of claim 8, wherein the generating comprises:
using a predetermined numeric base to divide the number into N pieces, each having a value less than the predetermined numeric base;
generating a dummy payload having a length equal to N plus a predetermined minimum length; and
generating N additional dummy payloads corresponding to the N pieces, each having a length equal to a value representing each piece plus the predetermined minimum length.

14. The access point of claim 8, wherein the generating comprises:
using a predetermined numeric base to divide the number into N pieces, each having a value less than the predetermined numeric base;
generating a dummy payload having a length equal to a reserved value that is reserved as a start of message symbol; and
generating N dummy payloads corresponding to the N pieces, each having a length equal to a value representing each piece plus a predetermined minimum length.

* * * * *